(12) United States Patent
Nakano

(10) Patent No.: US 7,847,448 B2
(45) Date of Patent: Dec. 7, 2010

(54) VEHICULAR ALTERNATING CURRENT GENERATOR

(75) Inventor: Kazutoshi Nakano, Kariya (JP)

(73) Assignee: Denso Corporation, Kariya (JP)

( * ) Notice: Subject to any disclaimer, the term of this patent is extended or adjusted under 35 U.S.C. 154(b) by 247 days.

(21) Appl. No.: 12/155,907

(22) Filed: Jun. 11, 2008

(65) Prior Publication Data
US 2008/0309181 A1  Dec. 18, 2008

(30) Foreign Application Priority Data
Jun. 13, 2007  (JP)  ............... 2007-155814

(51) Int. Cl.
*H02K 5/12* (2006.01)
(52) U.S. Cl. ........................ 310/88; 310/239
(58) Field of Classification Search ............. 310/85–89, 310/238, 239
See application file for complete search history.

(56) References Cited

U.S. PATENT DOCUMENTS

| | | | | |
|---|---|---|---|---|
| 3,269,175 A | * | 8/1966 | Sprosty | ................... 73/862.68 |
| 5,296,772 A | * | 3/1994 | Bradfield et al. | ............ 310/242 |
| 6,515,398 B1 | * | 2/2003 | Fudono et al. | ............... 310/239 |

FOREIGN PATENT DOCUMENTS

| JP | A-63-174536 | 7/1988 |
|---|---|---|
| JP | A 9-19111 | 1/1997 |

OTHER PUBLICATIONS

"Notification of Reasons for Rejection" (English-Translated Japanese Office Action) Jan. 27, 2009; 1 pp; Japan.

* cited by examiner

*Primary Examiner*—Dang D Le
(74) *Attorney, Agent, or Firm*—Oliff & Berridge, PLC

(57) ABSTRACT

A vehicular alternating current generator has slip rings, an enclosure, a rear cover, and a sealing plate. The slip rings are provided on a rotary shaft of a rotor. The enclosure component encloses a peripheral space surrounding the slip rings and brushes, and the rear cover covers electrical components including the brushes. The sealing plate, which is made of a material having elasticity, is attached to an end surface of the rear cover in a vertical direction and encloses a surrounding area of the enclosure component.

4 Claims, 4 Drawing Sheets

VEHICULAR ALTERNATING CURRENT GENERATOR

CROSS REFERENCE TO RELATED APPLICATION

The present application relates to and incorporates by reference Japanese Patent application No. 2007-155814 filed on Jun. 13, 2007.

BACKGROUND OF THE INVENTION

1. Technical Field

The present invention relates to a vehicular alternating current generator (alternator) mounted on a passenger car, a truck, and the like.

2. Related Art

Conventionally, as a vehicular alternating current generator mounted on a passenger car, a truck, and the like, there is, for example, an invention disclosed in Japanese Patent Laid-open Publication No. 09-019111. The vehicular alternating current generator has a brush peripheral structure that improves hermeticity of space surrounding slip rings by covering a surrounding area of a sliding surface between brushes and the slip rings. In the brush peripheral structure, under an assumption that water infiltrates an opening section provided on a sealing cap, the infiltrating water is drained through use of a conductive groove.

In the brush peripheral structure disclosed in the above-described Japanese Patent Laid-open Publication No. Heisei 9-19111, when an amount of water infiltrating the opening section provided on the sealing cap is too large, draining may be too slow. A problem occurs in that water resistance is insufficient in the surrounding area of the slip rings.

SUMMARY OF THE INVENTION

The present invention has been achieved based on the above-described issues. An object of the present invention is to provide a vehicle alternating current generator (alternator) that can improve water resistance in an area surrounding slip rings.

To solve the above-described issues, the vehicular alternating current generator of the present invention includes slip rings provided on a rotary shaft of a rotor, an enclosure component that encloses a peripheral space surrounding the slip rings and brushes, a rear cover that covers electrical components including the brushes, and a sealing plate made of a material having elasticity that is attached to an end surface of the rear cover in a vertical direction and encloses a surrounding area of the enclosure component.

In the vehicular alternating current generator of the present invention, as a result of the surrounding area of the enclosure component enclosing the peripheral space surrounding the slip rings and the brushes being further covered by the sealing plate, an amount of water reaching the enclosure component within the rear cover can be reduced. Therefore, water resistance in the surrounding area of the slip rings can be improved.

The above-described sealing plate is preferably formed for an area that is positioned in an over-head direction when the vehicular alternating current generator is mounted on a vehicle.

The above-described rear cover preferably has double-layer partitioning sections sandwiching the sealing plate. The sealing plate is preferably mounted between the double-layer partitioning sections.

DETAILED DESCRIPTION OF THE PREFERRED EMBODIMENTS

A vehicular alternating current generator according to an embodiment of the present invention will now be described in detail with reference to the drawings.

Figure 1:
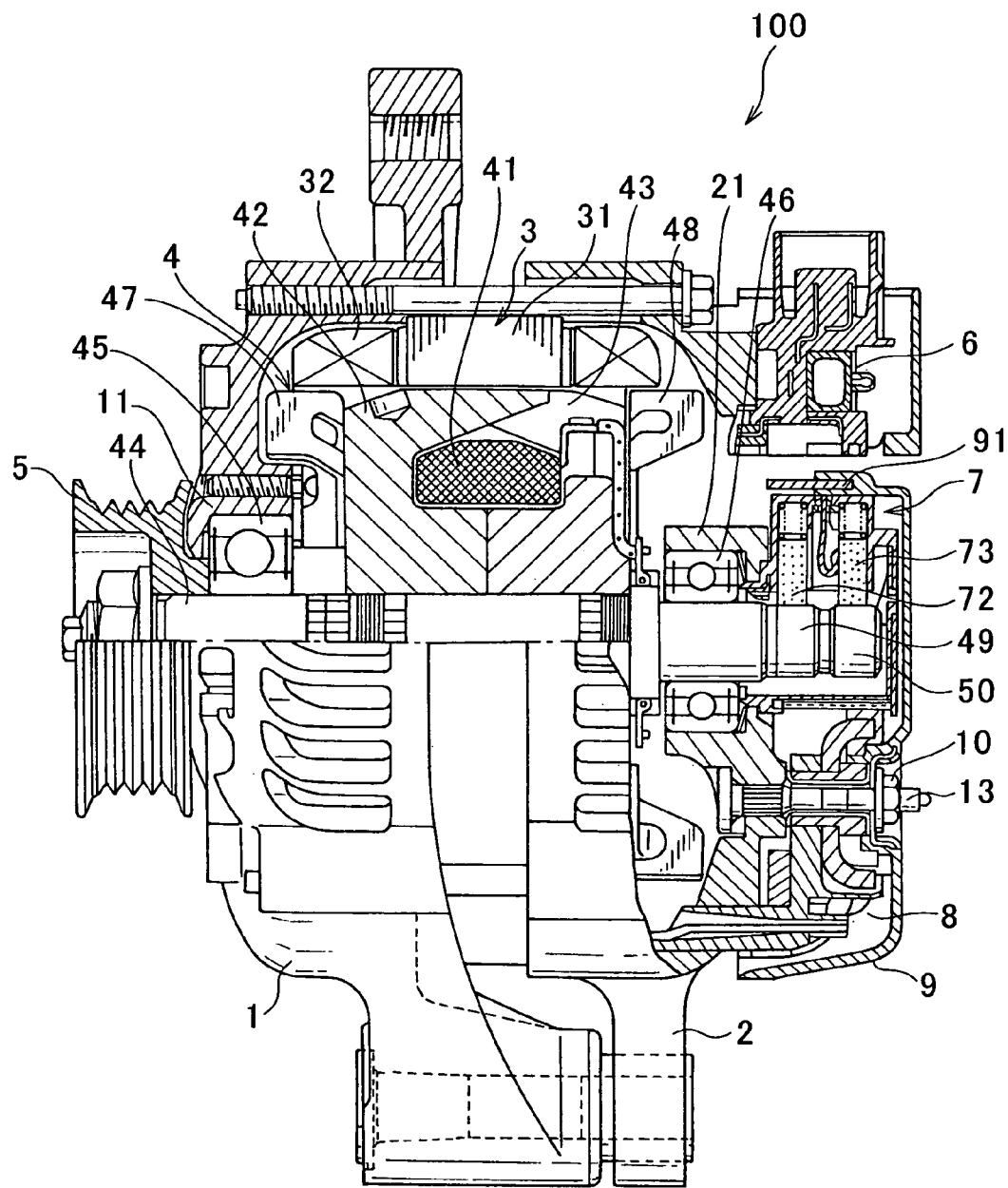
FIG. 1 is a diagram of an overall configuration of a vehicular alternating current generator according to an embodiment of the present invention.

FIG. 1 is a partial cross-sectional view of an overall configuration of the vehicular alternating current generator (alternator) according to the embodiment of the present invention. A vehicular alternating current 100 shown in FIG. 1 includes a front-side frame 1, a rear-side frame 2, a stator 3, a rotor 4, a voltage regulator 6, a brush device 7, a rectifier 8, a rear cover 9, and the like.

The front-side frame 1 and the rear-side frame 2 are both bowl-shaped and fixed to each other by a plurality of bolts, such that the stator 3 is sandwiched between opening sections of the front-side frame 1 and the rear-side frame 2. As a result, the stator 3 is fixed to respective inner circumferences of the front-side frame 1 and the rear-side frame 2. A cylindrical rolling bearing box 11 is integrally formed on the front-side frame 1. Similarly, a cylindrical rolling bearing box 21 is integrally formed on the rear-side frame 2.

The stator 3 includes a stator core 31 and a stator winding 32. The rotor 4 includes a field winding 41, pole cores 42 and 43, a rotary shaft 44, and the like. A portion of the rotary shaft 44 is rotatably supported by a pair of rolling bearings 45 and 46 fixed to the rolling bearing boxes 11 and 12. As a result, the overall rotor 4 fixed to the rotary shaft 44 is held to rotate freely with the rotary shaft 44 as the center. Centrifugal cooling fans 47 and 48 are respectively attached to axial direction end surfaces of the pole cores 42 and 43. A pulley 5 is attached to a front end of the rotary shaft 44 by a nut. The rotary shaft 44 is rotatably driven via the pulley 5 by the vehicular generator (not shown). A pair of slip rings 49 and 50 are provided on a rear end of the rotary shaft 44 positioned on an outer side of the rear-side frame 2. The pair of slip rings 49 and 50 are electrically connected to the field winding 41.

Electrical components, such as the voltage regulator 6, the brush device 7, and the rectifier 8, are fixed onto an outer axial direction end surface of the rear-side frame 2 by a fixing means, such as bolts. The voltage regulator 6 controls an output voltage from the vehicular alternating current generator 100 by adjusting an excitation current flowing to the field winding 41. The brush device 7 is used to send the excitation current from the rectifier 8 to the field winding 41 of the rotor 4. The brush device 7 has brushes respectively pressing against the slip rings 49 and 50 provided on the rotary shaft 44 of the rotor 4. The rectifier 8, for example, rectifies a three-phase alternating current that is an output voltage from a three-phase stator winding 32 and converts the three-phase alternating current to a direct current output voltage.

The rear cover 9 is made of resin. The rear cover 9 covers the electrical components, such as the voltage regulator 6, the brush device 7, and the rectifier 8, attached to the outer side the rear-side frame 2 and protects the components. The rear cover 9 is clamped and fixed by a nut 10 onto a bolt 13 that extends from the rear-side frame 2, such as to sandwich the rectifier 8 between the rear cover 9 and the rear-side frame 2.

Figure 2:
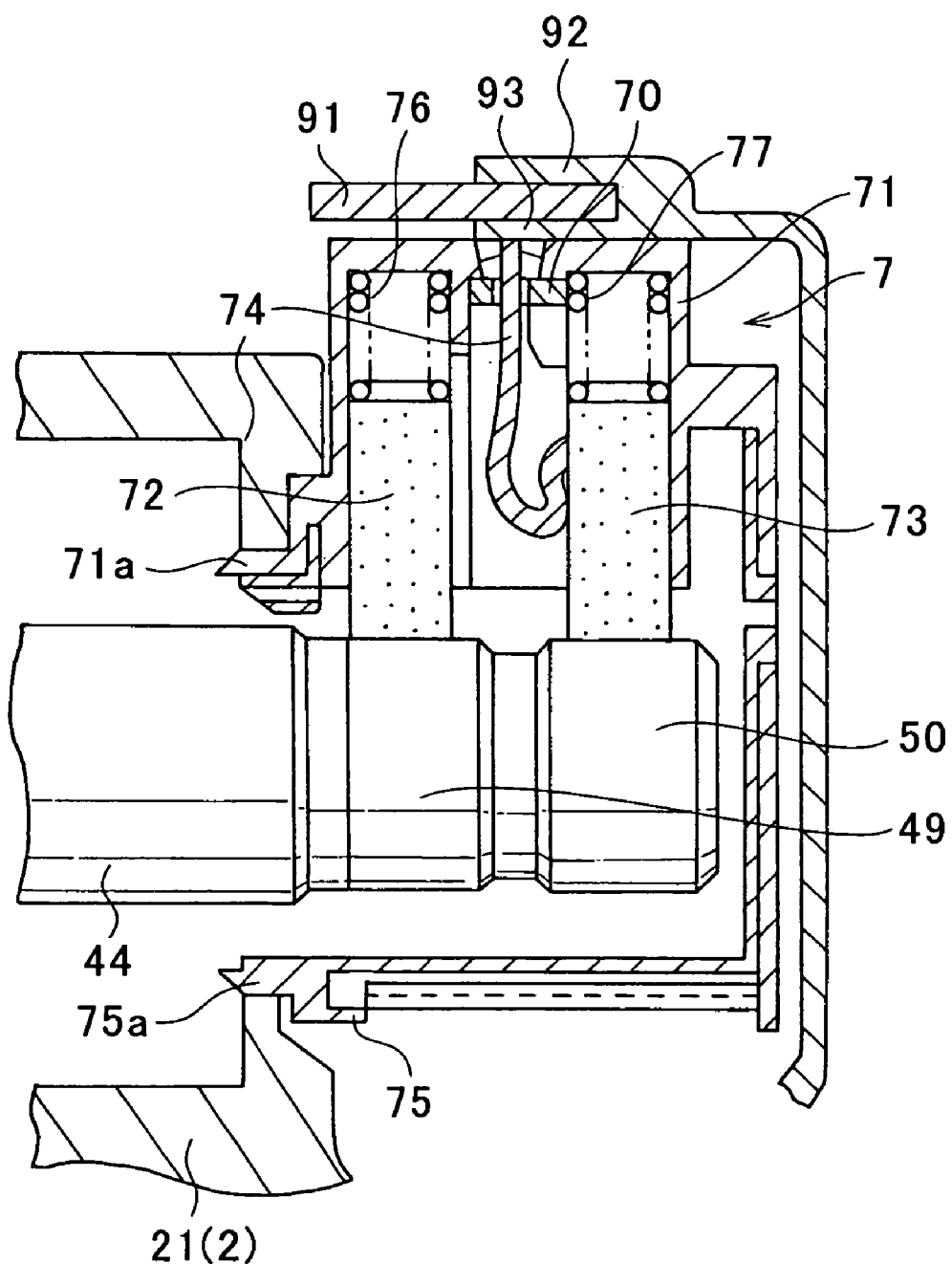
FIG. 2 is a cross-sectional view of a detailed structure of a brush device.
Figure 3:
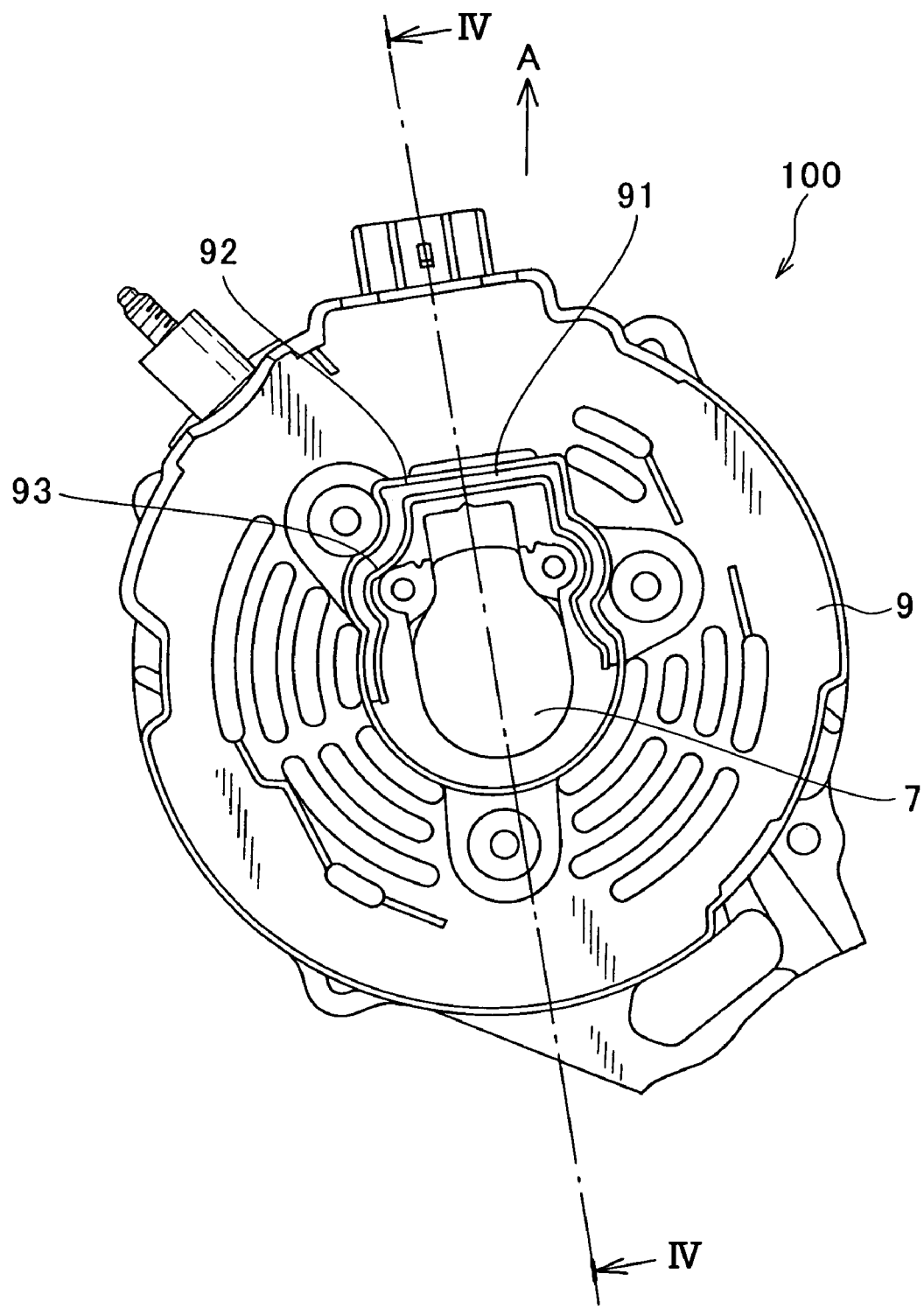
FIG. 3 is a planar view of a sealing plate in a mounted state.
Figure 4:
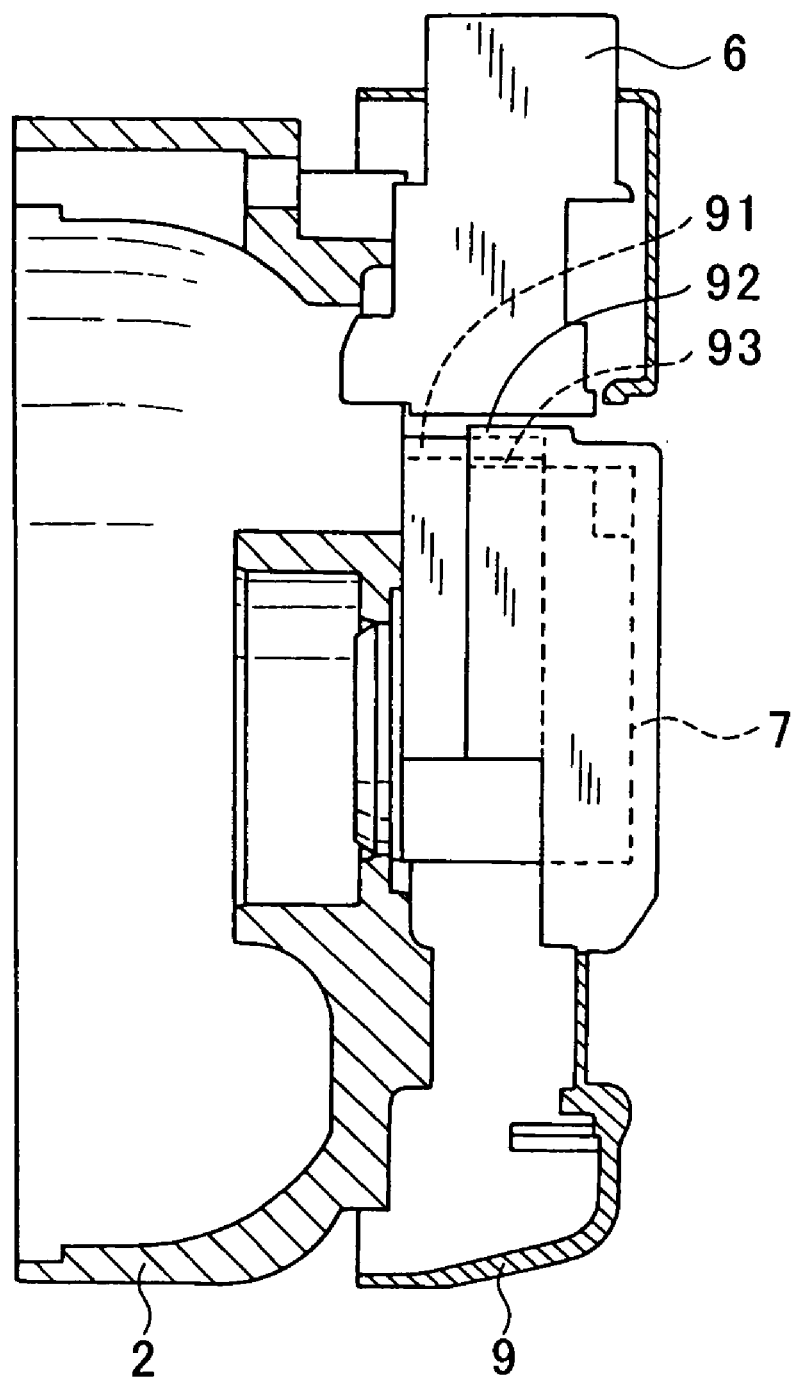
FIG. 4 is a cross-sectional view taken along line IV-IV in FIG. 3.

In the vehicular alternating current generator 100 according to the embodiment, a sealing plate 91 is disposed in the area surrounding the brush device 7, particularly in an overhead direction. FIG. 2 is a cross-sectional view of a detailed structure of the brush device 7, indicating a state of engagement with the rear-side frame 2. FIG. 3 is a planar view of the sealing plate 91 in a mounted state. FIG. 4 is a cross-sectional view of the sealing plate 91 in the mounted state, taken along line IV-IV in FIG. 3.

As shown in FIG. 2, the brush device 7 includes a resin brush holder 71, a pair of brushes 72 and 73, a pigtail 74, a resin slip ring cover 75, and springs 76 and 77. A connection terminal 70 is embedded in the brush holder 71. The pair of brushes 72 and 73 are in slidable contact with the slip rings 49 and 50. The pigtail 74 serves as a brush copper wire electrically connecting the brushes 72 and 73 with the connection terminal 70. The springs 76 and 77 press the respective tips of the brushes 72 and 73 against the slip rings 49 and 50. The brush holder 71 and the slip ring cover 75 form an enclosure component that encloses the surrounding area of the brushes 72 and 73 and the slip rings 49 and 50.

According to the embodiment, a portion 71a of the brush holder 71 and a portion 75a of the slip ring cover 75 together form a cylindrical section. The cylindrical section projects towards an opening section formed on the rear-side frame 2 to allow the rotary shaft 44 to pass. Hermeticity of peripheral space surrounding the slip rings 49 and 50 is ensured by an outer circumferential surface of the cylindrical section being in contact with an inner circumferential surface of the opening section. The hermeticity of the peripheral space surrounding the slip rings 49 and 50 can also be ensured by a diameter of the cylindrical section being set to be greater than a diameter of the opening section, and a sealing plate made of, for example, rubber being inserted between the cylindrical section and the rear-side frame 2, as according to a conventional structure. Alternatively, the cylindrical section can be formed by only the portion 71a of the brush holder 71. Moreover, the cylindrical section can be formed by only the portion 75a of the slip ring cover 75.

Next, details of the sealing plate 91 will be described. The sealing plate 91 is formed from a material (such as silicon rubber) having flexibility and elasticity. The sealing plate 91 is attached to an end surface of the rear cover 9 in a vertical direction. The sealing plate 91 encloses the surrounding area of the enclosure component configured by the brush holder 71 and the slip ring cover 75. For example, as shown in FIG. 3, the sealing plate 91 is formed for an area that is positioned in an over-head direction (a direction indicated by arrow A, and a direction opposite to a ground surface) when the vehicular alternating current generator 100 is mounted on a vehicle. The sealing plate 91 has an axial direction length that allows a tip of the sealing plate 91 to come into contact with the end surface of the rear-side frame 2, such that a gap is not formed between the sealing plate 91 and the end surface of the rear-side frame 2 when the rear cover 9 is mounted. Even when a degree of contact slightly changes for each vehicular alternating current generator 100 because of dimensional accuracy and the like, the sealing plate 91 having flexibility and elasticity deforms and maintains a state in which the tip of the sealing plate 91 and the end surface of the rear-side frame 2 are in contact.

The rear cover 9 includes double-layer partitioning sections 92 and 93 that sandwich the sealing plate 91. As a result of the sealing plate 91 being sandwiched between the double-layer partitioning sections 92 and 93, the sealing plate 91 is mounted on the rear cover 9. A width of the sealing plate 91 along the axial direction is set such that the tip of the sealing plate 91 comes into contact with the end surface of the rear-side frame 2 when the rear cover 9 is mounted on the rear-side frame 2. In the cross-sectional view of the rear cover 9 in FIG. 4, a side view of the partitioning sections 92 and 93 and the sealing plate 91 are shown.

In this way, in the vehicular alternating current generator 100 according to the embodiment, the surrounding area of the enclosure component enclosing the peripheral space surrounding the slip rings 49 and 50 and the brushes 72 and 73 is further covered by the sealing plate 91. Therefore, an amount of water reaching the enclosure component within the rear cover 9 can be reduced. As a result, water resistance in the area surrounding the slip rings 49 and 50 can be improved.

In the vehicular alternating current generator 100 according to the embodiment, the sealing plate 91 is formed for the area that is positioned in the over-head direction when the vehicular alternating current generator 100 is mounted on the vehicle. As a result of the sealing plate 91 being attached only in the area requiring improvement in water resistance, the sealing plate 91 can be made compact. Cost of materials can be reduced. Interior space of the rear cover 9 can be effectively used. Moreover, the double-layer partitioning sections 92 and 93 are formed on the rear cover 9. Because the sealing plate 91 is mounted between the double-layer partitioning sections 92 and 93, the sealing plate 91 can be attached by simply being sandwiched between the double-layer partitioning sections 92 and 93. Operations for mounting and fixing the sealing plate 91 can be facilitated, and workability of attachment can be improved.

The present invention is not limited to the above-described embodiment. Various modifications can be made within a scope of the spirit of the present invention. For example, according to the above-described embodiment, the sealing plate 91 is disposed in a position that is the over-head direction when the vehicular alternating current generator 100 is mounted on the vehicle. However, the position is not limited thereto. The sealing plate 91 can be disposed over an entire circumference.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A vehicular alternating current generator comprising:
a rotor having a rotary shaft, the rotary shaft having a length defining an axial direction;
slip rings provided on the rotary shaft of the rotor;
an enclosure component enclosing the slip rings and brushes;
a rear cover covering electrical components including the brushes, the rear cover having an end surface; and
a sealing plate made of a material having elasticity and attached to the end surface of the rear cover so as to be directed in a vertical direction vertical to the axial direction, the sealing plate enclosing the enclosure component,
wherein the rear cover has double-layer partitioning sections which support the sealing plate by partly sandwiching the sealing plate between the double-layer partitioning sections, the sealing plate extending from the double-layer partitioning sections in the axial direction.

2. The vehicular alternating current generator according to claim 1, wherein the sealing plate has an extending portion extending from the double-layer partitioning sections, the extending portion is positioned to partly enclose an upper area of the enclosure component, the upper area being upward when the vehicular alternating current generator is mounted on a vehicle.

3. The vehicular alternating current generator according to claim 2, further comprising a frame supporting a stator which is opposed to the rotor, the frame including a rear-side frame located adjacently to the enclosure component,
wherein the sealing plate has a tip which comes in contact with the rear-side frame in the axial direction.

4. The vehicular alternating current generator according to claim 3, wherein the sealing plate is made of silicon rubber.

\* \* \* \* \*